Oct. 9, 1945.  R. S. ELBERTY, JR  2,386,304
MOTOR CONTROL DEVICE
Original Filed Oct. 17, 1940
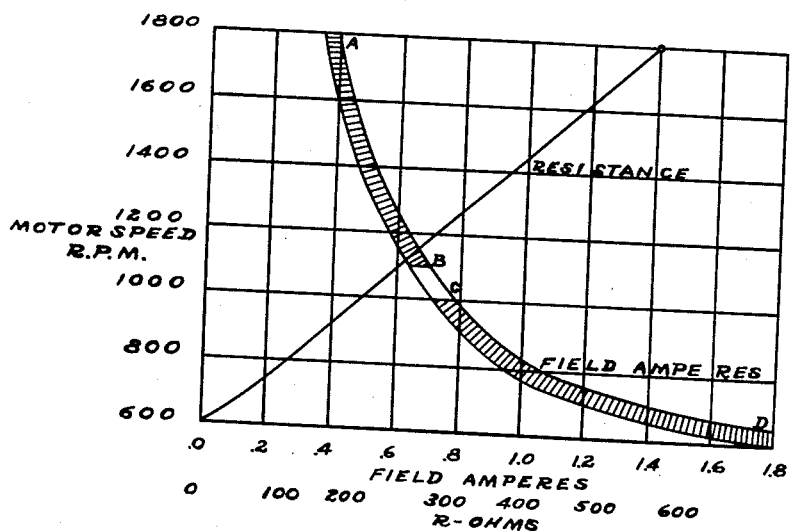
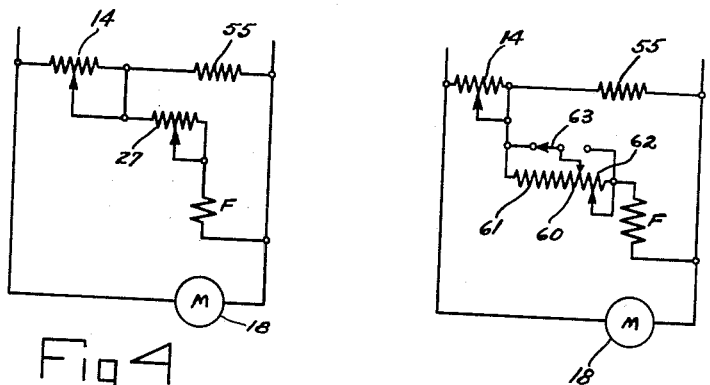
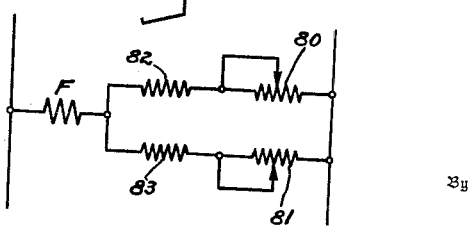
Inventor
ROBERT S. ELBERTY JR.
By Hugh N. Roeber
Attorney Patented Oct. 9, 1945

2,386,304

UNITED STATES PATENT OFFICE 2,386,304

MOTOR CONTROL DEVICE

Robert S. Elberty, Jr., Waynesboro, Pa., assignor to Landis Tool Company, Waynesboro, Pa.

Original application October 17, 1940, Serial No. 361,535. Divided and this application June 3, 1942, Serial No. 445,618

4 Claims. (Cl. 172—239)

This application is a division of my copending application Serial No. 361,535, filed October 17, 1940, now Patent No. 2,302,304 granted November 17, 1942 and the invention disclosed herein relates to speed control mechanisms for use where the relation between angular speed and peripheral speed of a tool or work piece or other object is constantly changing.

An object of the invention is to provide a speed control mechanism for adjusting the angular speed of a rotating member so that the selected peripheral speed may be maintained substantially constant as the diameter of the rotating member changes.

A further object of the invention is to provide a speed control mechanism of the above type wherein the speed of a driving member is so controlled and modified as to maintain the peripheral speed of a driven member substantially constant as the diameter of the driven member changes or increases.

A further object is to provide an electrical circuit for an electric motor whereby the speed of said motor may be adjusted by increments which are a fixed percentage of the preceding speed.

Figure 1 is a curve showing the relation between motor speed, field current and resistance in the field.

Figure 2 is a wiring diagram showing an improved type of circuit for use with two adjustable resistances.

Figure 3 is a diagram of a circuit having means for varying the range of peripheral speeds.

Figure 4 is an optional circuit for selecting and maintaining wheel speeds.

Conventional adjustable speed motors may be operated at a plurality of speeds differing from one to another by a fixed number of revolutions. This type of speed control is satisfactory for the majority of applications. However, there are a great many mechanisms wherein it is desired to maintain a selected peripheral speed of a driven mechanism and wherein the length of the periphery is continually changing. It is also advantageous on some applications to change or adjust the peripheral speed. However, the change in R. P. M. per increment of regulating resistance must vary depending upon the diameter of the driven member or else the increments of resistance must change for a given change in R. P. M. by an amount dependent upon the diameter of the driven member. The first method is preferred. Applicant has found that this result may be obtained within close limits by using a circuit wherein two adjustable resistances, another resistance, and the motor field are connected in series multiple relation.

Series multiple circuits as such are not new, a few having been cited against the parent application. However, none of these is capable of performing the function of the circuits described herein. The value of each resistance in these circuits had to be calculated with the object of combining in a given circuit to produce the desired effect in the operation of a motor. The conception of the result described and the working out of the means for obtaining that result represents a decided advance in the art of motor speed control.

The principal application of my invention has to do with maintaining a constant surface speed for a grinding wheel as the wheel becomes smaller due to wear and dressing. One application of my invention is the operation of facing off a large disk on a lathe or similar machine where it is desired to maintain a constant work speed at the point of engagement between work and tool. There are numerous other uses for my invention; for example, in winding material on a reel or spool, it is often desirable to drive the spool at a changing rate so that the material may move at a substantially constant rate, and to further adjust the rate of movement of the material. My invention may be applied to such apparatus with little or no difficulty. As applied to electrical apparatus, my invention need not be limited to speed control thru the motor field, but may be used with any form of adjustable resistance. Obviously the invention is a device for selecting and regulating surface speed of one member of a machine relative to the position of another member where such surface speeds vary depending upon the diameter of the member at the point where the speed is measured.

A typical motor curve having the points A, B, C, and D, indicated thereon is disclosed in Figure 1. This figure shows graphically the relation between motor speed, resistance and field current for a given motor. The portions A–B and C–D show the speed range of the motor for extreme positions of adjustable resistance 14. For a single rheostat control it will be noted that the variation in motor speed for a given change in resistance is proportionally greater at the lower speeds than at the higher speeds.

However, in the circuit shown in Figure 2, a resistance 55 is placed in the field circuit in series with the adjusting resistance 14 and in parallel with the regulating resistance 27. The purpose of the resistance is to act as a bleeder and to cause the regulating resistance to effect a difference in speed which is a fixed percentage of the preceding speed rather than a fixed number of revolutions when the adjustable resistance 14 is cut into the circuit or when it is set for any speed. This circuit has been found to give the best results.

The values of adjustable resistances 14 and 27 and resistance 55 can be calculated to give a very close approximation of the required speed range when the motor characteristics are known. This is done by selecting the values of 14, 27, and 55 to meet conditions indicated on motor curve as points A, B, C, and D. For example, consider a motor having a field resistance $R_f$ of 130 ohms and a speed range of 600–1800 R. P. M. In the circuit shown in Figure 2, $R_{14}$ is the resistance value of resistance 14, $R_{27}$ the value of adjustable resistance 27, and $R_{55}$ the value of resistance 55. With adjustable resistance 14 cut out, resistance 55 has no effect since full voltage is then applied directly to adjustable resistance 27.

From Figure 1, the manufacturers' curve for this particular motor, we find that for a speed of 990 R. P. M., an external resistance value of 190 ohms is required. Therefore, the value of adjustable resistance 27 or $R_{27}$ is 190 ohms. By cutting in all of $R_{14}$ at this time, the maximum speed of the motor, 1800 R. P. M., may be obtained. With $R_{14}$ all in the circuit and $R_{27}$ all out, the motor speed will be 1100 R. P. M., $I_f$ will be .636 amp., $E_f$ 83 volts. Under these conditions the voltage drop across resistance 55 will also be 83 volts. These figures may all be obtained from the motor characteristic as disclosed by the manufacturers' curve and the application of Ohm's law thereto. The voltage drop $ER_{14}$ across the adjustable resistance 14 under the above conditions would be the difference between the line voltage, 230, and the voltage drop across the field, 83, or 147. From Ohm's law:

$$\frac{\dfrac{R_{14}}{1}}{\dfrac{1}{R_{55}}+\dfrac{1}{130}}=\frac{147}{83}$$

or (A) $130\,R_{14}+R_{14}R_{55}-232\,R_{55}=0$

When both resistances are cut in, that is, with $R_{27}$ equal to 190 ohms for 1800 R. P. M., the manufacturers' motor characteristic curve indicates that the current thru the field $I_f$ will be .35 amp., the drop across the field $E_f$, 45 volts, the drop across $R_{27}$, 67 volts. The voltage drop across $R_{55}$ under these conditions should be equal to the sum of these voltages, that is, 45 plus 67 or 112 volts. The drop across $R_{14}$ at this time would be 230 minus 112 or 118 volts. According to Ohm's law:

$$\frac{\dfrac{R_{14}}{1}}{\dfrac{1}{R_{55}}+\dfrac{1}{190-130}}=\frac{118}{112}$$

or (B) $320\,R_{14}+R_{14}R_{55}-337\,R_{55}=0$

Equation A minus Equation B is $190\,R_{14}-105\,R_{55}=0$
Therefore $R_{55}=1.81\,R_{14}$ Substituting and solving for $R_{14}$ in either of the Equations A or B, gives a value of 160 ohms and therefore $R_{55}$ is equal to $1.81 \times 160$ or 290 ohms. By following the above procedure the values of resistances 14, 27, and 55 may be determined for any motor. It has been determined that the total resistance in the circuit of Figure 2 may be expressed as follows:

$$R_t = R_{14} + R_{14}\left(\frac{R_{27}+R_f}{R_{55}}\right) + R_{27}$$

The objects of this invention may be attained more or less satisfactorily by using any of a number of electrical circuits the resistances of which would have to be calculated in a manner similar to that disclosed herein. For example, in Figure 4 is shown a circuit wherein the controlling resistances are in series with the field and in parallel with each other. Each of the parallel circuits consists of an adjustable resistance 80 and 81 respectively and another resistance 82 or 83 respectively inserted ahead of said adjustable resistances. Resistance 82 prevents resistance 81 from becoming inoperative when resistance 80 is zero. Resistance 83 prevents resistance 80 from becoming inoperative when resistance 81 is zero. The circuits shown in Figures 2 and 4 have one thing in common, that is, they are series multiple circuits including the motor field, two adjustable resistances and additional resistance which may or may not be adjustable.

The circuit disclosed in Figure 3 is identical with that shown in Figure 2, except that an adjustable resistance 60 is substituted for adjustable resistance 27. Adjustable resistance 60 has two ranges 61 and 62 and a switch 63 to shift from one range to the other. The same result might be accomplished by using two independent resistances with a switch to change from one to the other. Figure 3 shows switch 63 in position to cut out portion 61 of adjustable resistance 60.

Operation

In the operation of my device a predetermined motor speed is selected by means of adjustable resistance 14, and in response to changes in the driven mechanism, adjustable resistance 27 will be shifted so as to change the motor speed by an amount which is a fixed percentage of the preceding speed. For example, at a speed of 1600 R. P. M. a given change in resistance 27 would change the speed by say 10%, or 160 R. P. M., while at a speed of 800 R. P. M. the same change in resistance would change the motor speed only 80 R. P. M.

This result is obtained by the use of a fixed resistance 55 which has the effect of modifying the values of the adjustable resistances 14 and 27 depending on the respective adjustment of said resistances. Actually, resistance 55 may be adjustable but after its value has been determined there is no need for any change. For this reason it is more practical to use a fixed resistance.

Resistance 55 functions by dissipating a definite part of the electrical energy which would otherwise pass thru the field winding F of motor 18. The amount of energy so dissipated varies with the setting of the adjustable resistances. The result of using such a bleeder is that for a given rheostat or combination of rheostats a wider range of speeds may be obtained than with the rheostats by themselves.

I claim:
1. In a speed control mechanism, a shunt motor, a motor field winding, means for changing the speed of said motor by increments which are a fixed percentage of the preceding speed including an adjustable resistance for varying the strength of said motor field, a bleeder resistance in parallel with said adjustable re- sistance and means for selecting a series of basic motor speeds to be varied by said adjustable resistance including a second adjustable resistance in series with said bleeder and said first adjustable resistance.

2. In a speed control mechanism, a shunt motor, a motor field winding, a pair of adjustable resistances for controlling the speed of said motor, one of said resistances being used to select a predetermined motor speed, the other to vary the motor speed relative to said selected speed and means for causing said speed to vary by increments which are a fixed percentage of the preceding speed in response to equal increments of resistance regardless of said selected speed including a bleeder resistance in series with said selecting resistance and in parallel with said second resistance and said motor field.

3. In a speed control mechanism an electric circuit including a shunt motor, a motor field winding, a source of power for said motor, an adjustable resistance in circuit with said field winding for selecting any of a plurality of motor speeds, a second adjustable resistance for adjusting said motor speed relative to said selected speed and means to maintain a fixed percentage of speed change for a given change of resistance by regulating the effective rate of change of the total field resistance including a bleeder resistance in parallel with the motor field and said adjusting resistance and in series with said selecting resistance.

4. In a speed control mechanism an electric circuit including a shunt motor, a motor field winding, a source of power for said motor, an adjustable resistance in circuit with said field winding for selecting any of a plurality of motor speeds, a second adjustable resistance for adjusting said motor speed relative to said selected speed and means to maintain a fixed percentage of speed change for a given change of resistance by regulating the effective rate of change of the total field resistance including a bleeder resistance in parallel with the motor field and one of said adjustable resistances and in series with the other of said adjustable resistances.

ROBERT S. ELBERTY, Jr.